Oct. 7, 1958  J. M. KADERLY  2,854,846
DEVICE FOR SETTING AND MEASURING FLEXIBLE PARTS
Filed Oct. 24, 1955  2 Sheets-Sheet 1

INVENTOR.
JAMES M. KADERLY.
BY
Albert J. Henderson
HIS ATTORNEY.

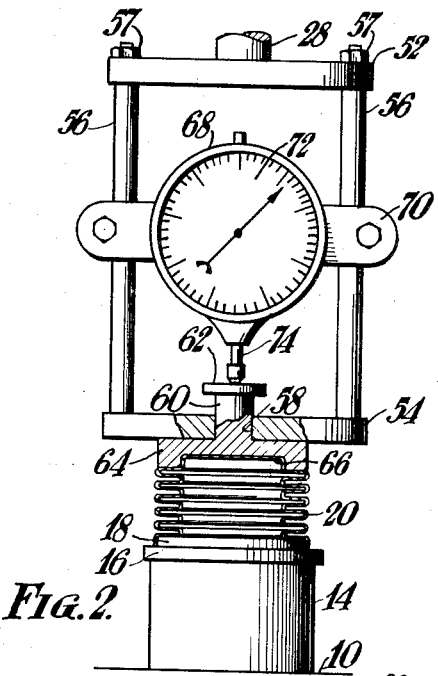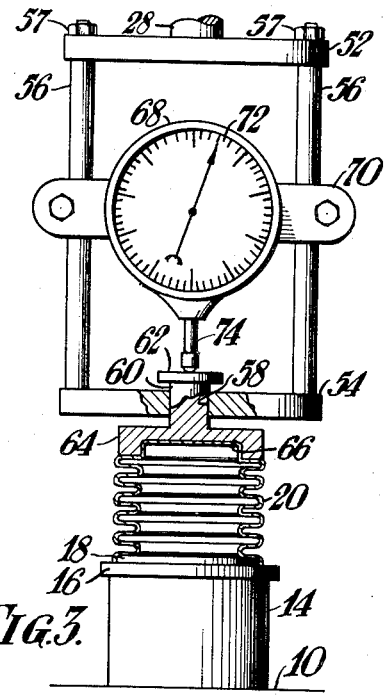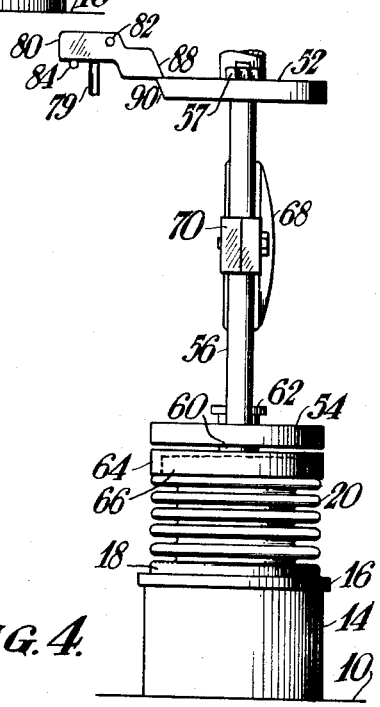

United States Patent Office 2,854,846
Patented Oct. 7, 1958

2,854,846

DEVICE FOR SETTING AND MEASURING FLEXIBLE PARTS

James Milo Kaderly, Knoxville, Tenn., assignor to Robertshaw-Fulton Controls Company, Greensburg, Pa., a corporation of Delaware Application October 24, 1955, Serial No. 542,364

4 Claims. (Cl. 73—4)

This invention relates to apparatus for setting or measuring flexible parts and more particularly to a device for setting and measuring the length of a flexible part in one operation.

This invention has particular utility in connection with the setting and measuring of flexible bellows, although as will be apparent to those skilled in the art the invention is capable of setting and measuring various flexible objects. Therefore, the application herein shown and described is for purposes of description, and the utility of the invention is not to be limited thereto.

Previous methods of setting flexible bellows or the like to length have been to compress the bellows a predetermined amount in a manually or mechanically operated press and then remove the bellows from the press to measure its free length by means of a scale or in some cases dial gauges. If the bellows is not of the specified length after the compressing operation, it is necessary to repeat the above operation until the required length is obtained.

It is an object of this invention to measure the length of the bellows during the compressing operation without removing the bellows from the machine.

Another object of this device is to set the bellows to length and measure the length in one operation.

In a preferred embodiment of the invention, a pneumatically operated press is controlled by means of a three-way solenoid valve and a time delay switching mechanism for compressing flexible bellows to a predetermined length. A measuring device is positioned whereby the free length of the bellows is measured automatically at one point on the upstroke of the press following the compressing stroke. Means including the said time delay switching mechanism are provided for holding the press at said one point for a predetermined time during the upstroke.

Other objects and advantages will become apparent from the following description taken in connection with the accompanying drawings wherein:

Fig. 2 is a front view of a portion of the setting and measuring device shown in Fig. 1 showing another operating position of the parts;

Figs. 3 and 4 are front and side views respectively of a portion of the setting and measuring device with the parts thereof in still another position:

Figure 1:
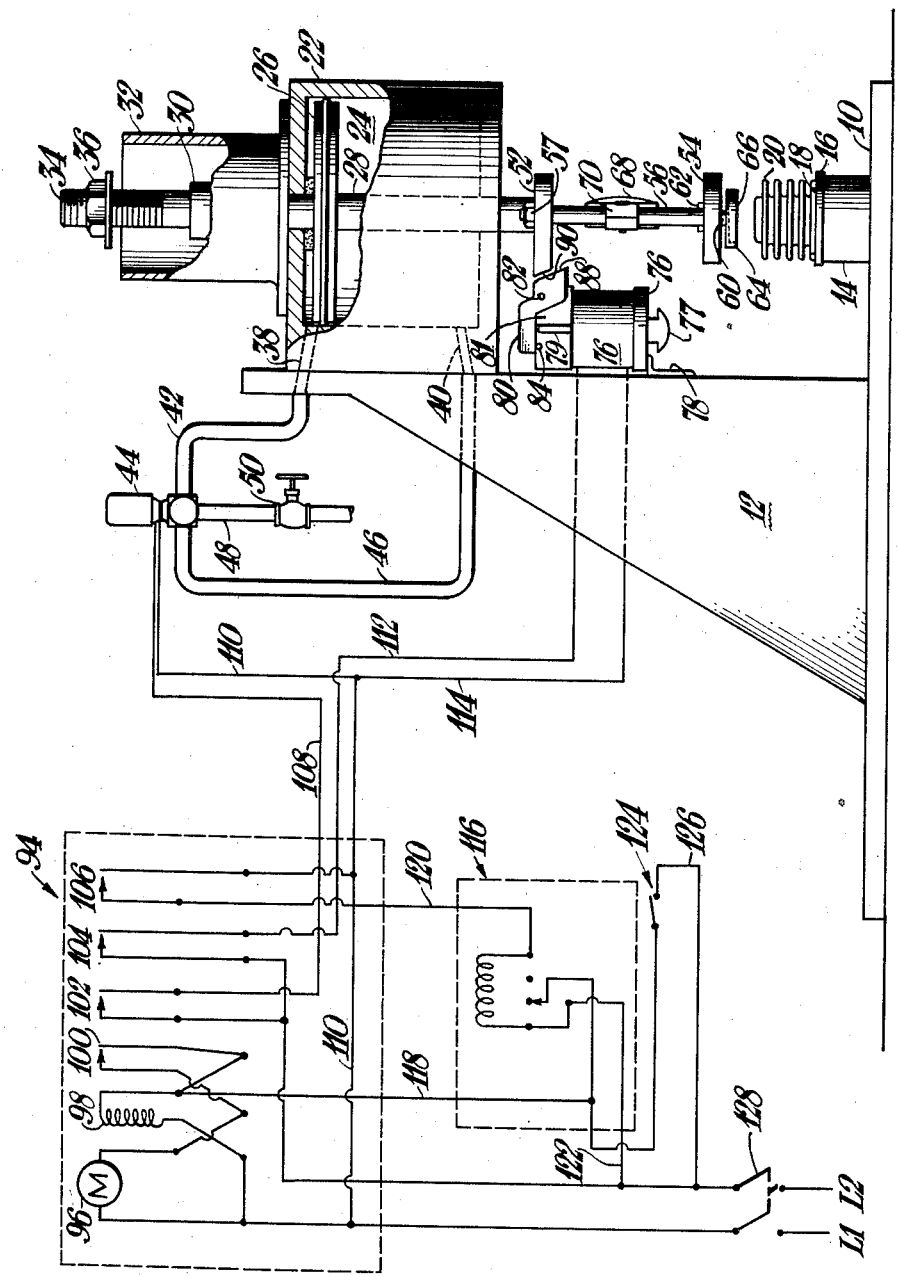
Fig. 1 is a side elevation, partly in section, of a setting and measuring device embodying this invention with the controls therefore shown in schematic relationship thereto.

Referring more particularly to Fig. 1, the measuring and setting device includes a flat base 10 which has a main supporting bracket extending upwardly therefrom. The base 10 may be mounted on any suitable structure and cooperates with the support 12 to support the parts now to be described.

A pedestal 14 is mounted on the base 10 adjacent the bracket 12 and provided with an annular flange 16 and reduced diameter portion 18 by means of which a flexible bellows 20 may be placed on the pedestal 14 for a compressing operation later to be described. A cylinder 22 is fixed to the upper portion of the bracket 12 above the pedestal 14 and is provided with a bore 24 therein which is in axial alignment with the pedestal 14. A cylindrical piston 26 is slidably positioned within the bore 24 for axial reciprocable movement relative to the pedestal 14. The piston 26 is connected to the medial portion of a piston rod 28 which extends through a centrally disposed bore of the piston 26 and has both the upper and lower ends thereof extending exteriorly of the cylinder 22.

The upper end of the rod 28 extends through a suitable centrally disposed boss 30 formed on the bottom wall of a tubular housing 32 which is attached to the upper end wall of the cylinder 22. The upper end of the rod 28 is provided with a threaded portion 34 on which a stroke adjustment nut 36 is threaded. The nut 36 is operative to engage the upper end of the boss 30 during downward movement of the piston 26 and rod 28. Thus, the nut 36 and upper end of the boss 30 define a range of movement of the piston 26, and adjustment of the nut 36 varies the length of downward stroke thereof.

For actuating the piston 26 between the above described positions, the side wall of the cylinder 22 is provided with an inlet passage 38 which communicates with the bore 24 above the piston 26 and another inlet passage 40 in the side wall which communicates with the bore 24 below the piston 26. A source of high pressure fluid, such as compressed air, may be connected to the passages 38, 40 for operating the piston 26 between positions in a manner well known in the art. To this end, the passage 38 is connected by means of a suitable pipe or conduit 42 to one outlet of a three-way solenoid valve 44, while the other passage 40 is connected by means of a pipe 46 to the other outlet of the solenoid valve 44. The inlet of the valve 44 may be connected by means of a pipe 48 to a source of high pressure fluid. A manually operable valve 50 of any suitable type may be provided in the pipe 48 to control supply of fluid to the valve 44.

The three-way solenoid valve 44 may be of any suitable type, however, in this embodiment the connection is preferably such that the valve 44 will establish communication between the pipes 42, 48 when energized and communication between the pipes 46, 48 when deenergized. Thus, when the valve 44 is energized, high pressure fluid will be supplied to the bore 24 on the upper side of the piston 26 to cause movement of the piston 26 downwardly until the nut 36 engages the boss 30. When the valve 44 is deenergized high pressure fluid will be supplied to the bore 24 on the lower side of the piston 26 tending to move the same upwardly into engagement with the upper end wall of the cylinder 22.

Referring now to Figs. 2, 3 and 4, the lower end of the rod 28 is fixed within a centrally disposed bore of a generally ellipsoidal shaped cross member 52 which overlies the pedestal 14 and is axially aligned therewith. A second cross member 54 is spaced from the member 52 by means of two parallel spaced rods 56, 56, each of which have one end threaded within the lower member 54 and the other end fixed to the upper member 52 by means of a nut 57. Both cross members 52, 54 are axially aligned with the pedestal 14 and rod 28.

The lower cross member 54 is provided with a centrally disposed bore 58 in which a stem 60 is slidably positioned in axial alignment with the pedestal 14. The stem 60 is provided with a flange 62 at its upper end which is engageable with the upper side of the cross member 54 and a larger diameter flange or pressure foot 64 at its lower end which is engageable with the lower side of the cross member 54 and with the end of the bellows 20. The flange or pressure foot 64 is provided with a suitable recess 66 on the lower side thereof which is adapted to enclose the upper end of the bellows 20 and maintain axial alignment thereof with the rod 28 when the flange 64 engages the bellows 20 during the compressing operation.

The flanges 62, 64 are preferably spaced to define a predetermined range of movement for the stem 60 within the bore 58. Thus, the stem 60 is movable between an upper position wherein the flange 62 engages the upper side of the cross member 54 and a lower position wherein the flange 64 engages the cross member 54. When the piston 26 is in the uppermost position as shown in Fig. 1, the force of gravity acting on the stem 60 and flanges 62, 64 causes the flange 62 to engage the upper side of the cross member 54. However, when the piston 26 is moved downward in response to energization of the valve 44, the flange 64 will move into engagement with the bellows 20. Further movement of the piston 26 then moves the cross member 54 into engagement with the flange 64 whereupon additional further movement of the piston 26 will cause compressing of the bellows 20 as shown in Fig. 2.

To check the length of the bellows 20 as set during the compressing operation, means are provided for measuring the free length of the bellows 20 during upstroke of the piston 26. To this end, a dial gauge 68 is adjustably supported between the rods 56, 56 by means of a bracket 70 which may have the ends thereof clamped to the rods 56, 56 as shown more clearly in Figs. 2, 3 and 4. The dial gauge 68 may be of any suitable type having an indicator head 72 and an outwardly biased movable spindle 74.

The dial gauge 68 is preferably positioned by means of the bracket 70 whereby the spindle 74 is engageable by the upper flange 62. During the upstroke of the piston 26, the bellows 20 will expand to its free length, and the cross member 54 will move out of engagement with the flange 64 and through the range of movement defined by the flanges 62, 64 as shown in Figs. 3 and 4. During this range of movement on the upstroke, the cross member 54 moves free of the stem 60 and flanges 62, 64, and the spindle 74 of the gauge 68 is connected to and positioned by the bellows 20. Thus, in the position of the cross member 54, shown in Figs. 3 and 4 the indicator 72 indicates the free length of the bellows 20.

In order that the operator may accurately obtain a reading of the indicator 72 during the upstroke, means are provided for latching the cross member for a predetermined time at the above-described point wherein the spindle 74 is positioned by the bellows 20. Referring now to Fig. 1, a solenoid 76 is fixed to the bracket 12 by means of a bracket 78. The solenoid 76 is provided with an axially movable armature 79 which has an end portion projecting from the solenoid 76.

A lever 80 overlies the solenoid 76 and armature 79 and is pivoted on a pin 82 mounted on a support 81 which in turn is mounted on the solenoid housing, and has one end thereof engageable with a stop pin 84. As shown in Fig. 1, the lever 80 engages the pin 84 under the influence of gravity when the solenoid 76 is deenergized.

The end of the lever 80 adjacent the rod 28 is provided with a generally inclined surface 88 which is cooperable with a complemental surface 90 on the cross member 52. During downward movement of the cross member 52, the surface 90 will engage the surface 88 to exert a wedging effect thereon and cause clockwise pivoting of the lever 80 about pin 82 as viewed in Fig. 1. Thus, the lever 80 does not limit downward movement of the cross member 52.

During upstroke of the piston 26, the cross member 52 will engage the lever 80 as shown in Fig. 4. In this case, the cross member 52 tends to rotate the lever 80 counterclockwise. However, the lever 80 engages the stop pin 84 which prevents counterclockwise rotation of the lever 80. Thus, cross member 52 and its related parts are stopped or latched during the upstroke at this point. If the solenoid 76 should be energized the armature 79 will move upward and cause clockwise pivoting of lever 80 about the pin 82 to a new position wherein the lever 80 is out of engagement with the cross member 52. A slight downward movement of cross member 52 occurs as lever 80 rotates clockwise. Thus, energization of the solenoid 76 releases the cross member 52 from its latched position as shown in Fig. 4.

As shown in Fig. 4, the position of the cross member 52 when the same engages the lever 80 during upstroke of the piston 26 is preferably that wherein the spindle 74 is positioned by the bellows 20 and stem 60 is free of the lower cross member 54. Thus, in the latched position of cross member 52 the indicator head 68 indicates the free length of the bellows 20.

Energization of the solenoid 76 is preferably controlled by a time delay switching means whereby the cross member 52 will be held in the above described latched position for the time necessary for the operator to record the reading of the indicator head 68. The switch mechanism may be of any suitable type and is shown schematically in Fig. 1 as taking the form of a Multi-flex multiple circuit reset timer indicated generally by the reference numeral 94. The timer 94 includes the usual motor 96, clutch coil 98 and cam plate (not shown) driven by the motor 96 to operate a plurality of switches 100, 102, 104, 106. The Multi-flex reset timer operates in a manner well known in the art, closing or opening the switches 100, 102, 104, 106 according to their settings. In this invention the timer 94 is connected to line wires L1 and L2 and the switches 102, 104 are connected to control energization of the solenoid valves 44 and 76 respectively. The switch 102 is connected by a lead wire 108 to one terminal of the solenoid valve 44, the other terminal of the solenoid valve 44 being connected by a return wire 110 to line wire L1. Similarly, one terminal of the solenoid 76 is connected to the switch 104 by lead wire 112, the other terminal of the solenoid 76 being connected by lead wire 114 to the return wire 110. The switch 100 controls energization of the timer motor 96. The switch 106 controls energization of a Multi-flex repeat cycle switch 116 which is connected by lead wires 118, 120 to the timer 94, and to line wire L2 by a lead wire 122. A manual repeat switch 124 may be connected by lead wire 126 to the repeat cycle switch 124 and line wire L2. A double pole switch 128 may be connected to the line wires L1, L2 to control energization of the above described switching apparatus.

The switches 102, 104 are preferably adjusted whereby switch 102 is closed and switch 104 is open at the beginning of the cycle. Thus, upon closing of the line switch 128, switch 102 energizes solenoid valve 44 which supplies high pressure fluid to the bore 24 on the upper side of the piston 26 and moves the piston 26 downward to compress the bellows 20. The delay on switch 102 is preferably set whereby the solenoid 44 is deenergized when the stroke adjustment nut 36 engages the boss 30 whereupon high pressure fluid will be supplied to the other side of the piston 26 to move the same upward. At the hereinbefore described point in the upstroke, the cross member 52 will engage lever 80 and movement thereof is stopped. The time delay on switch 104 is preferably set whereby the switch 104 will energize solenoid 76 to release the cross member 52, after a time delay sufficient for the operator to record the reading of the indicator 68.

*Operation*

The bellows 20 may be placed on the pedestal 14 in the manner shown in Fig. 1 with the end thereof engaging the flange 16 and reduced diameter portion 18 engaging the inside wall of the bellows 20 to maintain axial alignment thereof with the pedestal 14. The device may be placed in operative condition by opening the manually operative valve 50 which supplies high pressure fluid to the solenoid valve 44. Since the line switch 128 is open, the solenoid valve 44 will not be energized, and high pressure fluid will be supplied through pipe 46 and passage 40 to the bore 24 on the lower side of the piston 26. Thus, the piston 26 will be in its uppermost position as shown in Fig. 1.

To start the compressing operation, line switch 128 is closed to energize the timer 94. Since the switch 102 is closed at the beginning of the cycle as previously described, solenoid valve 44 will be energized upon closing of line switch 128 and high pressure fluid will be supplied through pipe 42, passage 38, to bore 24 on the upper side of the piston 26. The high pressure fluid acting on the upper surface of the piston 26 causes downward movement on the assembly comprising piston 26, rod 28, cross members 52, 54, rods 56, 56, stem 60 and dial gauge 68 until the lower flange 64 engages the upper end of the bellows 20, whereupon the lower cross member 54 will move out of engagement with the upper flange 62 and into engagement with the lower flange 64 (Fig. 2). Additional downward movement of the above assembly now causes compression of the bellows 20 and such downward movement will continue until the stop nut 36 engages the boss 30.

Since the time delay for which switch 102 is set corresponds to time required for the downstroke of the piston 26, upon engagement of nut 36 with the boss 30, the timer 94 will substantially simultaneously open switch 102 to deenergize the solenoid valve 44. High pressure fluid is now supplied through pipe 46 and passage 40 to the bore 24 on the lower side of the piston 26. Upward movement of the above assembly now occurs until the cross member 52 engages the end of lever 80 as shown in Fig. 4. Stem 60 is now in its free or floating position whereby the spindle 74 is positioned by expansion of the bellows 20 to its free length. The lever 80 momentarily holds the above assembly in this position until the operator notes the reading of the indicator 72. The time delay switch means 94 then becomes operative to close switch 104 and energize solenoid 76 which rotates the lever 80 clockwise by means of plunger 79. This rotation of lever 80 releases the cross member 52 and the upward stroke of the above assembly continues until the piston 26 engages the upper wall of the cylinder 22. If the indicator 72 indicates that the bellows 20 has not been set sufficiently to length, the operator may repeat the above described cycle of operation by closing the manual repeat switch 124.

It will now be apparent that by the present invention I have provided a novel apparatus for setting a flexible part to length and measuring the length in one operation in accordance with the objects of the invention.

While only one embodiment of the invention has been herein shown and described, it will be apparent to those skilled in the art that the construction and arrangement of parts may be variously embodied or changed without departing from the scope of the invention as defined in the appended claims.

It is claimed and desired to secure by Letters Patent:

1. A device for setting and measuring flexible parts comprising means reciprocal from an initial position to a setting position for setting the part to a predetermined size, control means operable for actuating said setting means between said positions, means including said control means for holding said setting means in an intermediate position for a predetermined time following the setting operation, said intermediate position corresponding to said predetermined size of the part, and means carried by said setting means operative to indicate the size of the part in said intermediate position of said setting means.

2. A device for setting and measuring flexible parts comprising a member reciprocal from an initial position to a setting position for setting the part to a predetermined size, power operated means for actuating said member between said positions, an electric circuit including switch means for controlling said actuating means, a measuring and indicating device carried by said member and operable for measuring and indicating said predetermined size, a pressure foot loosely mounted on said member and movable relative thereto, said pressure foot being engageable with said measuring and indicating device and the part independently of said member in an intermediate position of said member, said intermediate position corresponding to said predetermined size of the part, and means including said electric circuit for holding said member in said intermediate position for a predetermined period sufficient for said measuring and indicating operation.

3. A device for setting and measuring flexible bellows to length comprising means reciprocal from an initial position to a setting position for setting the bellows to a predetermined length, power operated means for actuating said setting means between said positions, means including an electric circuit for controlling said actuating means, measuring means operative for indicating said predetermined length, a pressure foot carried by said setting means and operative to engage the bellows upon movement of said setting means toward said setting position, a lost motion connection between said pressure foot and said setting means operative to cause floating engagement of said pressure foot with said measuring means in an intermediate position of said setting means upon return movement thereof toward said initial position, said intermediate position corresponding to said predetermined length of the bellows, and means including a time delay switching mechanism for holding said setting means in said one position for a predetermined time delay sufficient for said measuring operation.

4. A device for setting and measuring the length of flexible bellows comprising means reciprocal from an initial position to a setting position for setting the bellows to a predetermined length, power operated means for actuating said setting means between said positions, means including an electric circuit for controlling said actuating means, a measuring and indicating device carried by said setting means and operable for measuring and indicating said predetermined length, a pressure foot carried by said reciprocal setting means and operative to engage the bellows upon movement of said setting means toward said setting position, said pressure foot being connected to said setting means whereby said pressure foot is movable relative to said setting means when said pressure foot is out of engagement with the bellows, means including said pressure foot for connecting the bellows directly to said measuring and indicating means independently of said setting means in an intermediate position of said setting means, said intermediate position corresponding to said predetermined length of the bellows, and means including said electric circuit for holding said setting means in said one position for a predetermined time delay sufficient for said measuring operation.

References Cited in the file of this patent

UNITED STATES PATENTS

| | | |
|---|---|---|
| 2,095,355 | Cate | Oct. 12, 1937 |
| 2,474,118 | Robinson | June 21, 1949 |
| 2,695,515 | Ward et al. | Nov. 30, 1954 |
| 2,724,961 | Logue | Nov. 29, 1955 |
| 2,746,288 | Scott | May 22, 1956 |
| 2,760,370 | Linhorst | Aug. 28, 1956 |